US012102024B2

(12) United States Patent
Procuniar et al.

(10) Patent No.: US 12,102,024 B2
(45) Date of Patent: Oct. 1, 2024

(54) DETERMINING VEHICLE HEADING AND IMPLEMENT HEADING OF LOW SPEED FARMING MACHINE

(71) Applicant: Deere & Company, Moline, IL (US)

(72) Inventors: Steven R. Procuniar, Urbandale, IA (US); Qiang R. Liu, Urbandale, IA (US); Curtis A. Maeder, Johnston, IA (US)

(73) Assignee: DEERE & COMPANY, Moline, IL (US)

( * ) Notice: Subject to any disclaimer, the term of this patent is extended or adjusted under 35 U.S.C. 154(b) by 351 days.

(21) Appl. No.: 17/536,543

(22) Filed: Nov. 29, 2021

(65) Prior Publication Data

US 2022/0408627 A1 Dec. 29, 2022

Related U.S. Application Data

(63) Continuation of application No. PCT/US2021/039004, filed on Jun. 24, 2021.

(51) Int. Cl.
*A01B 69/00* (2006.01)
*G05D 1/00* (2024.01)
*G06N 20/00* (2019.01)
*G06V 10/25* (2022.01)
*G06V 20/56* (2022.01)

(52) U.S. Cl.
CPC .......... *A01B 69/001* (2013.01); *A01B 69/004* (2013.01); *G05D 1/0246* (2013.01); *G06N 20/00* (2019.01); *G06V 10/25* (2022.01); *G06V 20/56* (2022.01)

(58) Field of Classification Search
CPC .. A01B 69/001; A01B 69/004; G05D 1/0246; G05D 1/027; G06N 20/00; G06V 10/25; G06V 20/56; G06V 10/422; G06T 2207/30252; G06T 7/73
See application file for complete search history.

(56) References Cited

U.S. PATENT DOCUMENTS

| 7,570,783 | B2 | 8/2009 | Wei et al. |
| 8,150,574 | B2 | 4/2012 | Han et al. |
| 9,904,290 | B2 | 2/2018 | Pickett et al. |

(Continued)

*Primary Examiner* — Anne Marie Antonucci
*Assistant Examiner* — Patrick Daniel Mohl
(74) *Attorney, Agent, or Firm* — Fenwick & West LLP

(57) ABSTRACT

A system and a method are disclosed for determining a heading of a vehicle and a heading of an implement of a farming machine when the farming machine is stationary or moving at a speed below a threshold speed. The vehicle and the heading are attached together via a pivot hitch. A farming machine management system receives coordinates from a first location sensor coupled to the vehicle and a second location sensor coupled to the implement. The farming machine management system determines intersection points between a first circle centered at the first location sensor and a second circle centered at the second location sensor. The farming machine management system selects one of the intersection points based on an output of a machine learning model. The farming machine management system determines the headings of the vehicle and the implement and generates instructions for operating the farming machine based on the headings.

20 Claims, 6 Drawing Sheets

(56) References Cited

U.S. PATENT DOCUMENTS

| | | | |
|---|---|---|---|
| 9,927,242 B2 | 3/2018 | Schleicher | |
| 10,512,204 B1 | 12/2019 | Gunbatar et al. | |
| 11,377,029 B2 * | 7/2022 | Yunus | G06T 7/73 |
| 2006/0142936 A1 * | 6/2006 | Dix | G01C 21/005 |
| | | | 701/41 |
| 2010/0312428 A1 * | 12/2010 | Roberge | A01B 79/005 |
| | | | 717/106 |
| 2018/0202804 A1 * | 7/2018 | Dumble | G01B 21/16 |
| 2019/0016264 A1 * | 1/2019 | Potnis | G06T 7/75 |
| 2020/0017143 A1 * | 1/2020 | Gali | G06T 7/70 |
| 2020/0164803 A1 * | 5/2020 | Jales Costa | B62D 15/0285 |
| 2021/0027490 A1 * | 1/2021 | Taiana | B60D 1/245 |
| 2021/0179172 A1 * | 6/2021 | Kroeze | G05D 1/0246 |
| 2021/0323555 A1 * | 10/2021 | Sholingar | B60W 10/10 |
| 2022/0138476 A1 * | 5/2022 | Niewiadomski | G06T 7/20 |
| | | | 382/181 |
| 2022/0366186 A1 * | 11/2022 | Sriram | G06N 3/084 |
| 2022/0408627 A1 * | 12/2022 | Procuniar | G06N 20/00 |

* cited by examiner

```
500   Receive a first set of coordinates from a first location sensor
      coupled to a vehicle at a first point
      510
              ↓
      Receive a second set of coordinates from a second location
      sensor coupled to an implement at a second point
      515
              ↓
      Identify one or more intersection points between a first
      circle centered at the first point and a second circle
      centered at the second point
      520
              ↓
      Select one intersection point from the one or more
      intersection points based on a relative angle between the
      vehicle and the implement
      525
              ↓
      Determine a first heading associated with the vehicle and a
      second heading associated with the implement based on
      the selected intersection point
      530
              ↓
      Generate instructions based on the first heading and the
      second heading to cause the vehicle to perform an action
      535
```

FIG. 5

DETERMINING VEHICLE HEADING AND IMPLEMENT HEADING OF LOW SPEED FARMING MACHINE

CROSS-REFERENCE TO RELATED APPLICATIONS

This application is a continuation of International Application No. PCT/US2021/039004 filed Jun. 24, 2021, which is incorporated by reference in its entirety.

TECHNICAL FIELD

The disclosure generally relates to the field of autonomous vehicles, and more particularly relates to improving determination of heading of autonomous and semi-autonomous farming machines including implements.

BACKGROUND

A farming machine may include a vehicle coupled to an implement, and the vehicle pushes or pulls the implement to perform various farming operations (e.g., tilling, planting seeds, treating plants). Typically, the farming vehicle has a location sensor (e.g., global positioning system sensor) that determines the location of the farming vehicle. As the farming vehicle moves, the location sensor collects location data and a heading (e.g., an orientation of the farming machine) of the farming vehicle is calculated based on changes in location data corresponding to the motion of the farming vehicle. However, the heading of the farming vehicle cannot be determined when the farming vehicle is stationary because there is no change in the location data or the determined heading is inaccurate when the farming vehicle is moving at a speed below a threshold speed because the error or noise in the location data is greater than the measured changes in the location data. Furthermore, the implement may be attached to the farming vehicle with a pivot hitch that allows the implement to move side to side about the pivot hitch, so the heading of the implement may not be aligned with the farming vehicle. Therefore, the movements of the farming vehicle and the implement are difficult to predict when the farming machine is stationary or moving below the threshold speed, which can lead to damage or accidents.

SUMMARY

Systems and methods are disclosed herein address the above-described problems related to accuracy of a heading of a vehicle and a heading of an implement when a farming machine is moving at a speed below a threshold speed. Instead of relying on changes in location data collected by a first location sensor coupled to the vehicle and a second sensor coupled to the implement over time to determine the headings, a farming machine management system determines a pivot point where a pivot hitch connects the vehicle and the implement. After determining the pivot point, the farming machine management system uses known dimensions of the vehicle and the implement to determine accurate headings for the vehicle and the implement even when the farming machine is stationary or moving at a speed below the threshold speed.

In some embodiments, the farming machine management system receives a first set of coordinates from the first location sensor coupled to the vehicle at a first point and a second set of coordinates from the second location sensor coupled to the implement at a second point. The implement is coupled to the vehicle at a pivot point using a pivot hitch, and the pivot hitch allows the implement to move about the pivot point. To determine where the pivot point is, the farming machine management system identifies one intersection point or two intersection points between a first circle centered at the first point and a second circle centered at the second point. The first circle has a first radius corresponding to a distance between the first point and the pivot point, and the second circle has a second radius corresponding to a distance between the second point and the pivot point. The farming machine management system selects one intersection point based on a relative angle between the vehicle and the implement. The farming machine management system determines a first heading associated with the vehicle and a second heading associated with the implement based on the selected intersection point. The farming machine management system generates instructions based on the first heading and the second heading to cause the vehicle to perform an action.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 5 illustrates a flowchart of a method for determining heading of a farming vehicle and an implement, according to an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
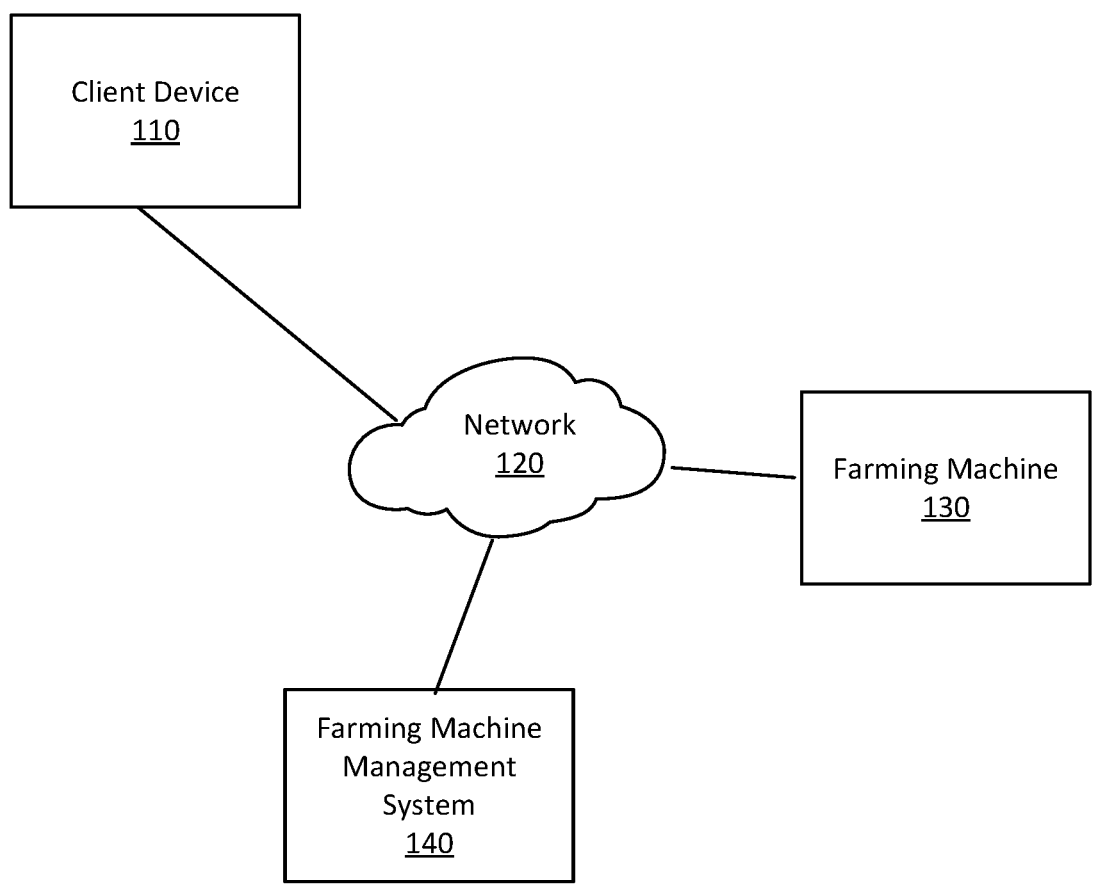
FIG. 1 illustrates a block diagram of a system environment for a farming machine management system, according to an embodiment.

Figure (FIG. 1 illustrates a block diagram of a system environment 100 for a farming machine management system, according to an embodiment. The system environment 100 includes a client device 110, a network 120, a farming machine 130, and a farming machine management system 140. The system environment 100 may have alternative configurations than shown in FIG. 1 and include different, fewer, or additional components.

The client device 110 is a device used by a user to operate the farming machine 130. For example, the user may be an employee associated with the farming management system 140, a third party individual, or an individual associated with a field where the farming machine 130 is being used (e.g., a farmer that owns the field). The farming machine 130 may be controlled remotely based on inputs from the client device 110 or operate semi-autonomously based on inputs describing the tasks to be performed by the farming machine 130 such as types of tasks, time at which the tasks are to be performed, portions of the field in which the tasks are to be performed, and other information for operating the farming machine 130. In other embodiments, the farming machine 130 may be autonomous and operate without input from the user. The client device 110 is configured to communicate with the farming machine 130 and/or the farming machine management system 140 via the network 120, for example using a native application executed by the computing device and provides functionality of the farming machine management system 140, or through an application programming interface (API) running on a native operating system of the computing device, such as IOS® or ANDROID™. The client device 110 may be a conventional computer system, such as a desktop or a laptop computer. Alternatively, the client device 110 may be a device having computer functionality, such as a personal digital assistant (PDA), a mobile telephone, a smartphone, or another suitable device. The client device 110 may be integrated with the farming machine 130 (e.g., a console within the farming machine 130). The client device 110 include the hardware and software needed to input and output sound (e.g., speakers and microphone) and images, connect to the network 120 (e.g., via Wifi and/or 4G or other wireless telecommunication standards), determine the current geographic location of the client device 110 (e.g., a Global Positioning System (GPS) unit), and/or detect motion of the client device 110 (e.g., via motion sensors such as accelerometers and gyroscopes).

The client device 110 is configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as a control area network (CAN), Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 3:
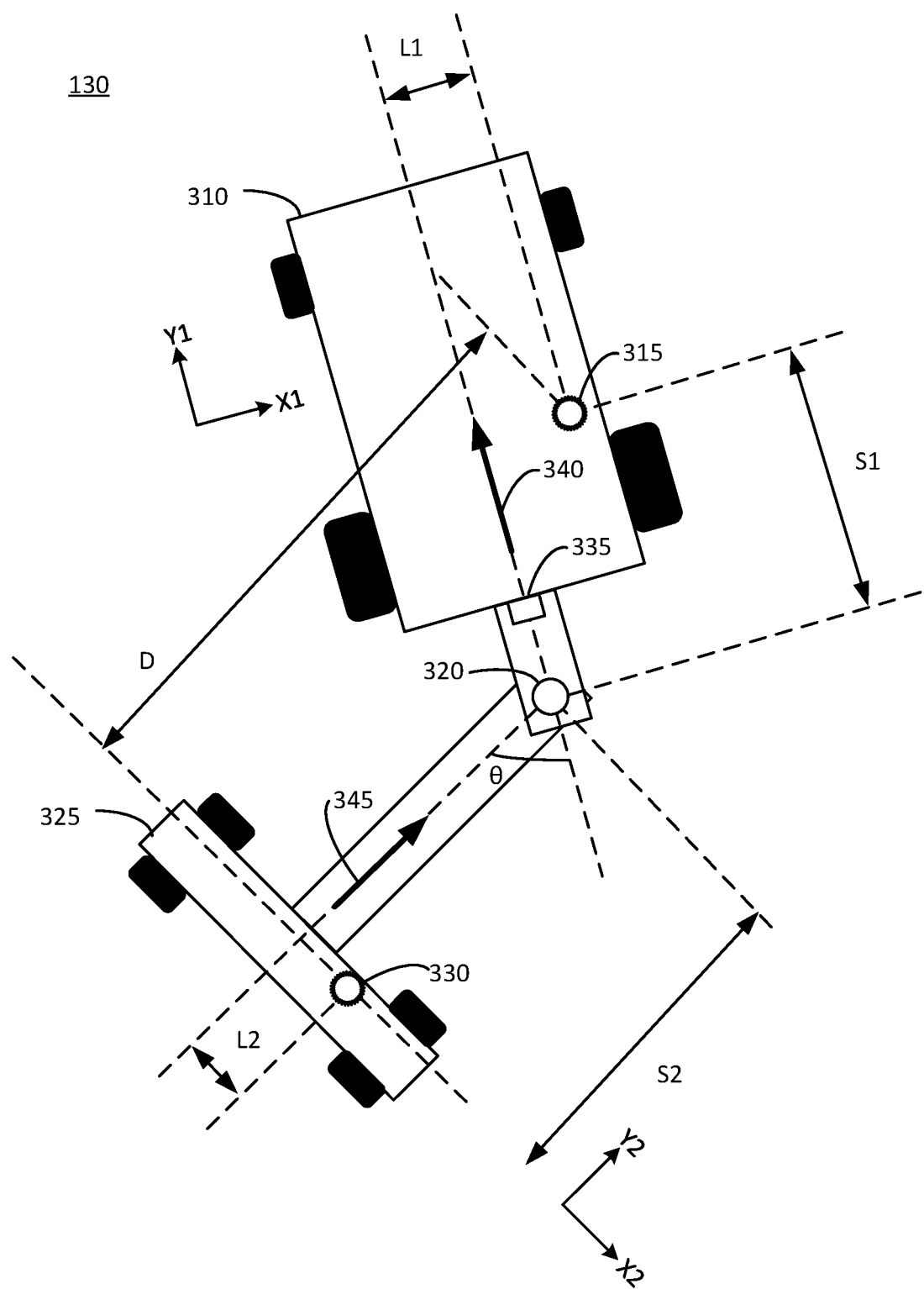
FIG. 3 illustrate a top view of a farming vehicle and an implement, according to an embodiment.

The farming machine 130 performs farming tasks in a farming area. The farming area may include leveled surfaces. The farming machine 130 receives instructions for performing the farming tasks from the farming machine management system 140 and generates control instructions for controlling components of the farming machine 130 to perform the farming tasks. An example farming machine 130 is described herein with respect to FIG. 3. The example farming machine 130 of FIG. 3 includes a vehicle 310 that is removably or statically coupled to an implement 325 via a hitch 320. The vehicle 310 may be remotely controlled, semi-autonomous, or autonomous and include a driving mechanism (e.g., a motor and drivetrain coupled to wheels) for traversing through the farming area. The implement 325 is coupled to the rear of the vehicle 310 such that the implement 325 is dragged behind the vehicle 310. In alternative embodiments, a different type of implement 325 may be coupled to the front of the vehicle 310 or to the side of the vehicle 310.

When the hitch 320 is a fixed hitch, the implement 325 is coupled to the vehicle 310 at one position (e.g., straight behind the vehicle) such that the heading of the vehicle 310 and the heading of the implement 325 are aligned. However, when the hitch 320 is a pivot hitch, the implement 325 may pivot side-to-side about the hitch 320, such that the heading of the vehicle 310 and the heading of the implement 325 are different. The term "heading" is used to refer to the orientation of the vehicle 310 or the implement 325 indicative of the future direction of motion. The heading of the vehicle 310 is represented by a first vector 340 that passes through a pivot point (e.g., where the hitch 320 connects the vehicle 310 and the implement 325) and a center of the vehicle (e.g., geometric center of the vehicle). The heading of the implement 325 is represented by a second vector 345 that passes through the center of the implement 325 (e.g., geometric center of the implement 325) and the pivot point, and the second vector 345 is at an angle θ from the first vector 340.

The vehicle 310 includes a first location sensor 315 and the implement 325 includes a second location sensor 330 that each continuously collects geolocation and time information corresponding to the motion of the vehicle 310 and the implement 325, respectively. The first location sensor 315 and the second location sensor 330 may be integrated with inertial measurement units (IMU) that detects acceleration and rotational rate along pitch, roll, and yaw axes. The first location sensor 315 and the second location sensor 330 provides the collected information to the farming machine management system 140. The first location sensor 315 is positioned at a first position on the vehicle 310 that is offset from a center line through the vehicle 310 by L1 along a first lateral axis X1 and offset by S1 relative to the hitch 320 along a first vertical axis Y1. The second location sensor 330 is positioned at a second position on the implement 325 that is offset from a center line through the implement 325 by L2 along a second lateral axis X2 and offset vertically by S2 relative to the hitch 320 along a second vertical axis. The first location sensor 315 and the second location sensor 325 are at a distance D apart that can vary according to the angle θ. The distances S1, S2, L1, and L2 are fixed and may be measured by personnel associated with the farming machine management system 140 before the farming machine 130 is deployed (e.g., manufacturer of the farming machine 130, test operator of farming machine management system 140) or may be measured by a user of the farming machine (e.g., farmer) and input to the farming machine management system 140 after being deployed.

The vehicle 310 includes a camera 335 attached to the back of the vehicle 310 and directed to capture images of the implement 325 that follows behind the vehicle 310. The captured images may be provided to the farming machine management system 140 that determines the angle θ between the center line of the vehicle 310 and the center line of the implement 325. In some embodiments, the camera 335 is installed to be aligned with the center line of the vehicle 310. In other embodiments, the camera 335 is installed elsewhere on the vehicle 335. The camera 335 is calibrated to determine intrinsic parameters such as local length, skew, distortion, and image center and extrinsic parameters such as position and orientation of the camera 335 relative to the vehicle 310. In an alternative embodiment, the camera 335 may be replaced with a potentiometer or other sensors that generates signals according to the angle θ.

When guiding the farming machine 130 through a field, the farming machine management system 140 needs to determine the heading of the vehicle 310 and the heading of implement 325 as well as the position of the farming machine 130 within the field to predict the motion of the farming machine 130. One method of determining the heading is to compare the information collected by location sensors at different points in time and use the change in the positions over time to calculate the heading. This method for determining the heading can be effective when the farming machine 130 is moving at a speed above a threshold speed. However, when the farming machine 130 is moving a speed below the threshold speed, the heading determined may be inaccurate due to limits in the accuracy of location sensors, and when the farming machine 130 is stationary, the method cannot be used since there is no change in positions. Operating the farming machine 130 without accurate headings for the vehicle 310 and the implement 325 can lead to damage or dangerous situations. For example, if the vehicle 310 is stationary at a first location near a second location where another farming machine, building, or personnel is located, and the calculated heading of the vehicle 310 indicates that the vehicle 310 is pointed away from the second location, the farming machine management system 140 may cause the farming machine 130 to start moving according to the calculated heading. However, if the heading of the farming machine is actually pointed toward second location, when the farming machine 130 begins to move, the vehicle 310 can unexpectedly end up at the second location and lead to an accident.

To determine accurate headings for the vehicle 310 and the implement 325, the farming machine management system 140 receives location information from the first location sensor 315 and the second location sensor 330, and uses images of the implement captured by the camera 335 to determined where the pivot point of the hitch 320 is located. Based on the determined pivot point, the farming machine management system 140 determines the headings of the farming machine 130 (e.g., heading of the vehicle 310, heading of the implement 325). The farming machine management system 140 may generate instructions for operating the farming machine 130. For example, the farming machine management system 140 may generate and transmit paths for the farming machine 130 to take or instructions to adjust the headings of the farming machine 130. Details on the farming machine management system 140 and the method of determining the headings using the pivot point are described below with respect to FIG. 2.

Figure 2:
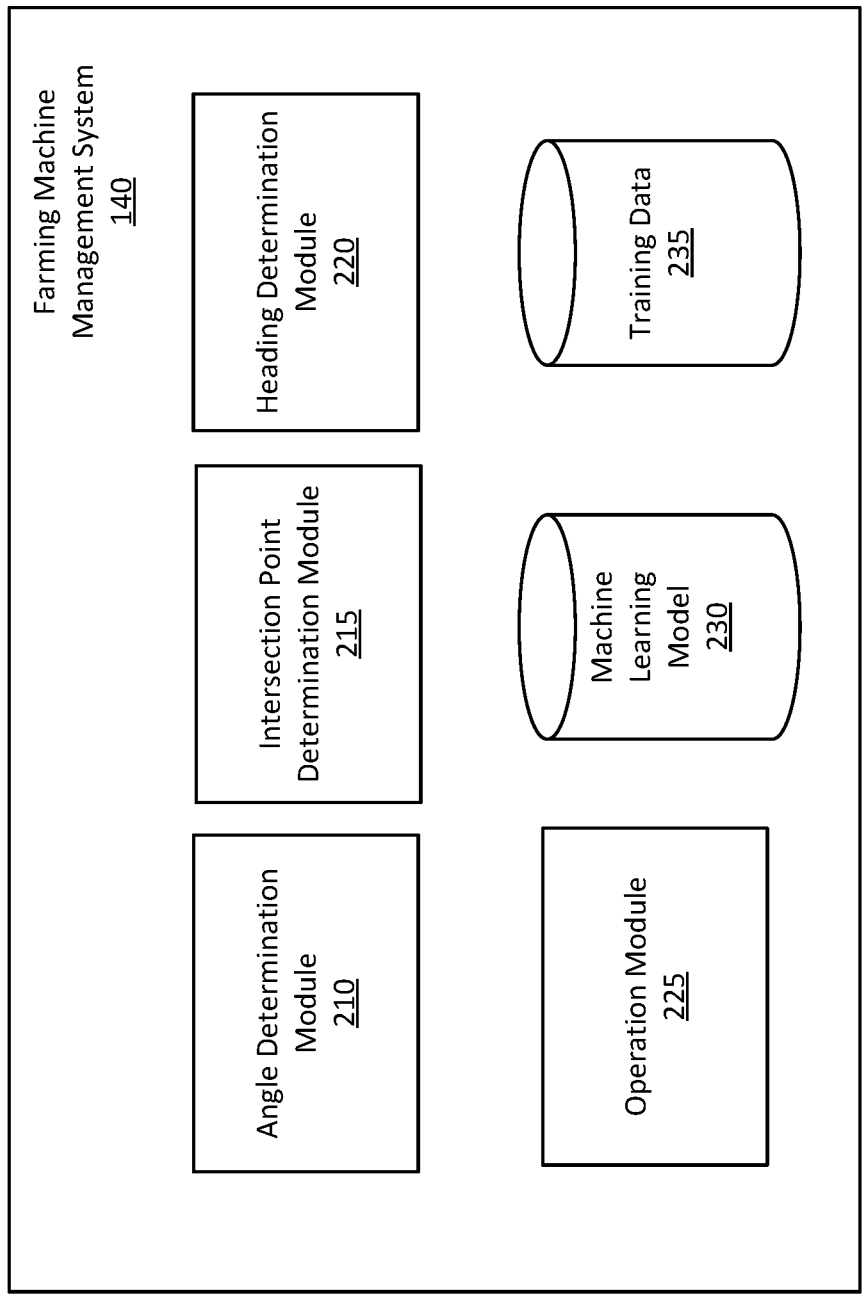
FIG. 2 illustrates a block diagram of modules and databases used by a farming machine management system, according to an embodiment.

FIG. 2 illustrates a block diagram of modules and databases used by a farming machine management system, according to an embodiment. The farming machine management system 140 includes an angle determination module 210, an intersection point determination module 215, a heading determination module 220, an operation module 225, a machine learning model database 230, and a training data database 235. The modules and databases depicted in FIG. 2 are merely exemplary; more of fewer modules and/or databases may be used by the action recommendation system 130 in order to achieve the functionality described herein. Moreover, these modules and/or databases may be located in a single server, or may be distributed across multiple servers. Some functionality of the farming machine management system 140 may be performed by the farming machine 130.

The angle determination module 210 processes an image of the implement 325 captured by the camera 335 to determine the angle θ between the vehicle 310 and the implement 325. In some embodiments, the angle determination module 210 may also modify the image (e.g., resizing, debayering, cropping, value normalization and adjusting image qualities such as contrast, brightness, exposure, temperature). The angle determination module 210 receives the image from the camera 335 and applies a machine learning model 230 to performing image recognition to identify the portion of the image including pixels that represent the implement 325 and determine the angle θ between the center line of the vehicle 310 and the center line of the implement 325. In some embodiments, the machine learning model 230 is a supervised model that is trained to output the angle θ for an input image. The machine learning model 230 may be a neural network, decision tree, or other type of computer model, and any combination thereof. Training data 235 for the machine learning model 230 may include training images of historical implements captured by cameras 335 installed on various historical farming machines 130. Each training image may be labeled to include a bounding box around at least a portion of the historical implement 325. The bounding box may be drawn by a human annotator to include the portion of the image including the historical implement 325. In some embodiments, there may be one or more fiducial markers at known locations on each historical implement 325 (e.g., along the center line of the implement 325), and a human annotator may place a bounding box around the fiducial marker.

For each training image, the intrinsic parameters such as local length, skew, distortion, and image center and extrinsic parameters such as position and orientation of the camera 335 that captured the training image are known. Based on these camera parameters and the position of the bounding box within the training image, the direction of the historical implement 325 and the angle θ can be determined. In one example, the camera 335 may be calibrated such that the center of the training image corresponds to the center line of the vehicle 310. In this example, the implement 325 is determined to be positioned to the right of the vehicle 310 if the bounding box lies to the right of the image center and determined to be positioned to the left if the bounding box lies to the left of the image center. The angle θ can be calculated between the image center and a centerline of the implement 325 in the bounding box. The angle θ associated with the training image are also included for training the machine learning model 230. Each training image may be associated with additional information and the additional information are provided along with the training image. The additional information include the dimensions of the historical vehicle 310 and/or the historical implement 325, intrinsic and/or extrinsic parameters of the corresponding camera 335, and other relevant features regarding the configuration of the historical farming machine 130. Dimensions of the historical vehicle 310 may include length, width, height of the historical vehicle 310, a distance between the first location sensor and the center line of the historical vehicle 310 (e.g., L1 in feet), a distance between the first location sensor and the hitch 320 (e.g., S1 in feet), and dimensions of the implement 325 may include length, width, height of the historical vehicle 310, a distance between the second location sensor and the center line of the implement 325 (e.g., S2 in feet), and a distance between the second location sensor and the hitch 320 (e.g., L2 in feet).

In an alternative embodiment, instead of the camera 335, a potentiometer or another type of sensor is installed at the hitch 320 to determine the angle $\theta$ between the vehicle 310 and the implement 325. The potentiometer generates a voltage value according to the angle $\theta$. The relationship between voltage values and the angle $\theta$ between the vehicle 310 and the implement 325 may be predetermined such that voltage value generated by the potentiometer can be mapped to an angle $\theta$.

Figure 4B:
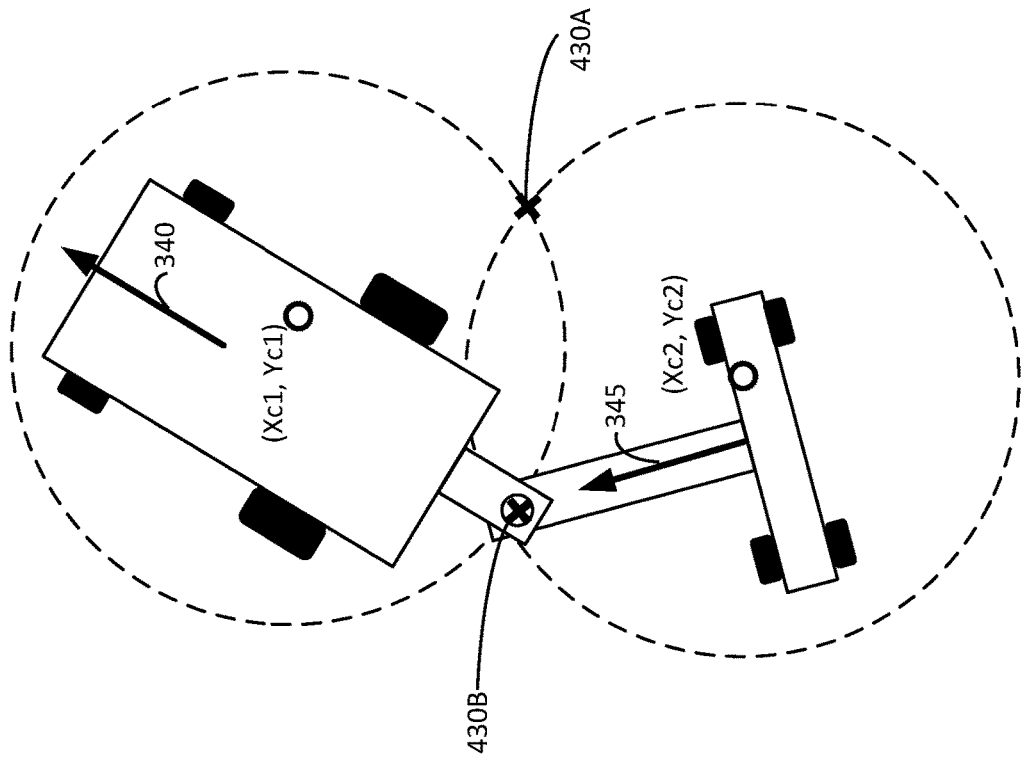
FIG. 4B illustrates a top view of a farming vehicle and an implement with a pivot point at a second intersection point of two circles, according to an embodiment.
Figure 4A:
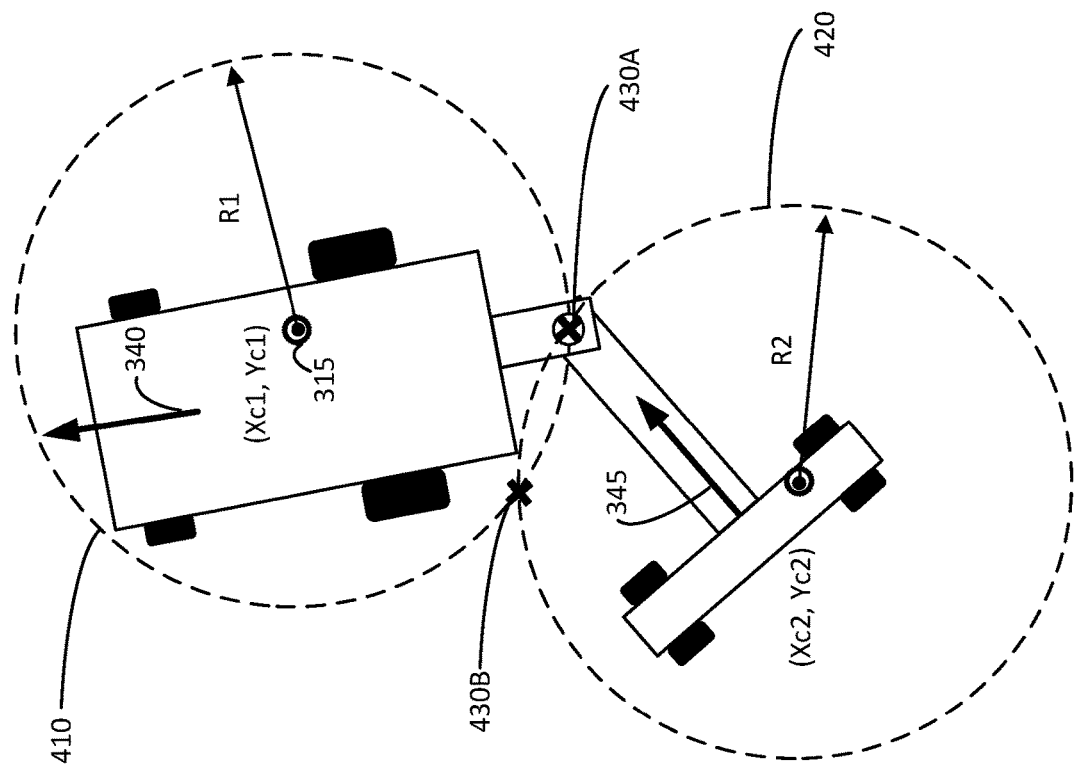
FIG. 4A illustrates a top view of a farming vehicle and an implement with a pivot point at a first intersection point of two circles, according to an embodiment.

The intersection point determination module 215 determines the pivot point where the hitch 320 is located. As illustrated in FIGS. 4A and 4B showing top views of a farming machine 130, when the first location sensor 315 reads a first set of coordinates (Xc1, Yc1) and the second location sensor 330 reads a second set of coordinates (Xc2, Yc2), there can be two possible headings for the vehicle 310 and the implement 325. Coordinates may be represented in geocentric coordinates, map coordinates, or spherical coordinate system. The intersection point determination module 215 identifies one or more intersection points between a first circle 410 centered at the first location sensor 315 and a second circle 420 centered at the second location sensor 330. The first circle 410 has a first radius R1 that corresponds to a distance between a position of the first location sensor 315 and the hitch 320, and the second circle 420 has a second radius R2 that corresponds to a distance between a position of the second location sensor 315 and the hitch 320.

Depending on where the first set of coordinates (Xc1, Yc1) and the second set of coordinates (Xc2, Yc2) are, there can be one intersection point or two possible intersection points between the first circle 410 and the second circle 420. For the first set of coordinates (Xc1, Yc1) and the second set of coordinates (Xc2, Yc2) in FIGS. 4A and 4B, there are two possible intersection points. In the first configuration shown in FIG. 4A, the hitch 320 is at a first intersection point 430A, and in the second configuration shown in FIG. 4B, the hitch 320 is at a second intersection point 430B. Coordinates of the first intersection point 430A and the second intersection point 430B can be calculated using the following equations:

$$(X-Xc1)^2+(Y-Yc1)^2=R1^2 \quad \text{(Equation 1)}$$

$$(X-Xc2)^2+(Y-Yc2)^2=R2^2 \quad \text{(Equation 2)}$$

$$\sqrt{S1^2+L1^2}=R1 \quad \text{(Equation 3)}$$

$$\sqrt{S2^2+L2^2}=R2 \quad \text{(Equation 4)}$$

The values of (Xc1, Yc1) and (Xc2, Yc2) are provided by the first location sensor 315 and the second location sensor 330, respectively. S1, L1, S2, and L2 are known distances. Using equations 1-4, up to two possible solutions for X and Y can be calculated. Therefore, the coordinates of the first intersection point 430A and the second intersection point 430B represented by (X, Y) can be determined.

Figure 4C:
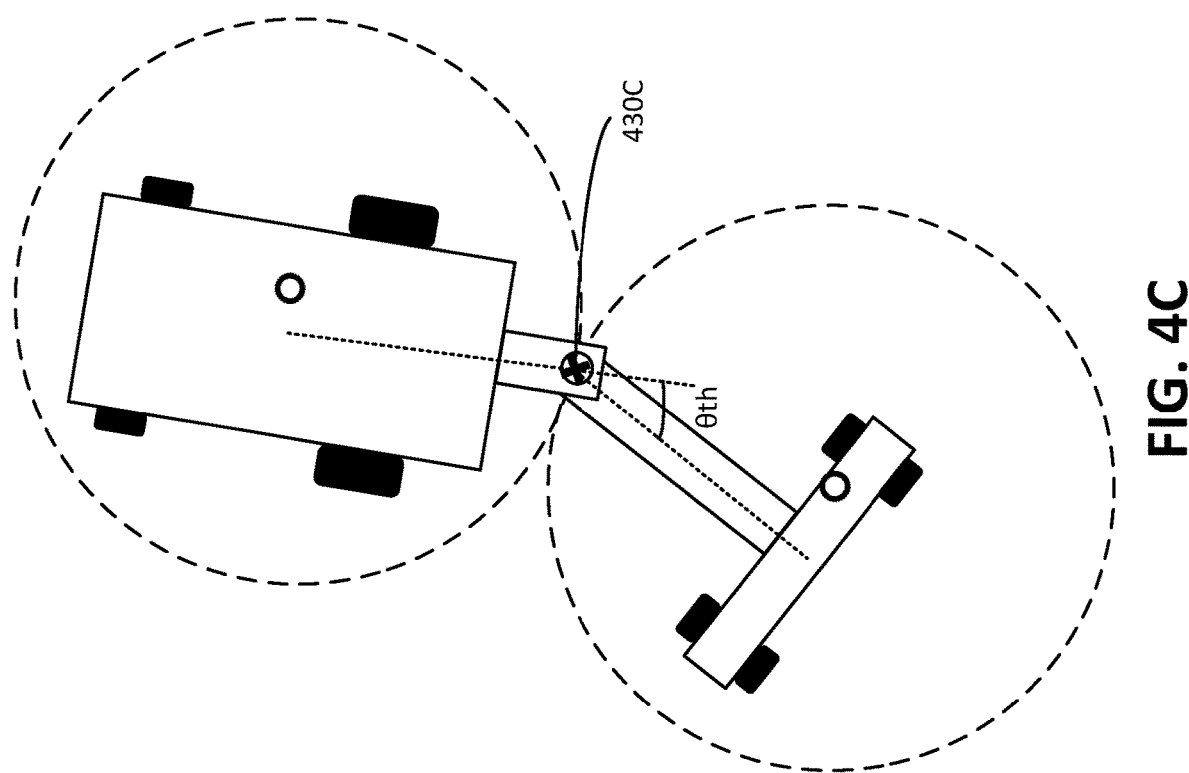
FIG. 4C illustrates a top view of a farming vehicle and an implement with a pivot point at a third intersection point of two circles, according to an embodiment.

After determining the coordinates of the first intersection point 430A and the second intersection point 430B, the intersection point determination module 215 selects one of the first intersection point 430A and the second intersection point 430B based on the angle of the implement 325 determined by the angle determination module 210. The intersection point determination module 215 identifies a threshold angle $\theta$th associated with the farming machine 130 given its dimensions. As illustrated in FIG. 4C, the threshold angle $\theta$th corresponds to the angle between the center line of the vehicle 310 and the center line of the implement 325 when the farming machine 130 is oriented such that the first circle 410 and the second circle 420 have exactly one intersection point 430C. The threshold angle $\theta$th of a farming machine 130 depends on offsets L1, L2, S1, and S2. The intersection point determination module 215 compares the angle $\theta$ determined by the angle determination module 210 to the threshold angle $\theta$th. For example, when the angle $\theta$ is less than the threshold angle $\theta$th, the intersection point determination module 215 determines that the hitch 320 is at the first intersection point 430A. When the angle $\theta$ is greater than the threshold angle $\theta$th, the intersection point determination module 215 determines that the hitch 320 is at the second intersection point 430B. When the angle $\theta$ is equal to the threshold angle $\theta$th, the intersection point determination module 215 determines that the hitch 320 is at the third intersection point 430C.

The heading determination module 220 determines the heading of the vehicle 310 and the heading of the implement 325 based on the intersection point. The heading determination module 220 determines the first vector 340 between the center point of the vehicle 310 and the intersection point representing the heading of the vehicle 310 and the first location sensor 315 and determines the second vector 345 between the second location sensor 330 and the intersection point representing the heading of the implement 325.

In some embodiments, the headings of the farming machine 130 are determined using the intersection point whenever the first location sensor 330 and the second location sensor 315 receive new location data (e.g., set of coordinates). In some embodiments, when the farming machine 130 is moving at a speed greater than a threshold speed, the headings of the farming machine 130 can accurately be determined using just location data collected by the first location sensor 330 and the second location sensor 315 over time, so the headings of the farming machine 130 may not be determined using the intersection point to save computational resources. In some embodiments, the headings of the farming machine 130 are determined using both methods and the results of the two methods are compared. If the results are different by more than a threshold amount, the farming machine management system 140 may generate and send a notification to the client device 110 associated with the farming machine 130 indicating that the farming machine 130 require examination. For example, the camera 335, the first location sensor 315, or the second location sensor 315 may not be functioning properly, the camera 335 may require recalibration, or the dimensions of the farming machine 130 (e.g., L1, L2, S1, S2) may need to be remeasured.

The operation module 225 generates instructions for operating the farming machine 130 based on the heading of the vehicle 310 and the heading of the implement 325. The operation module 225 generates the instructions to cause the farming machine 130 to perform an action. In some embodiments, the farming machine 130 may be semi-autonomous or autonomous. The operation module 225 may determine a path for the farming machine 130 to take based on the headings of the farming machine 130 and cause the farming machine 130 to move along the path. In other embodiments, the farming machine 130 may be remotely controlled based on input from a human operator (e.g., farmer) via the client device 110. The farming machine management system 140 may generate and present a user interface that includes a map of a field including a graphical element representing the farming machine 130 to the human operator. The graphical element may be positioned according to the heading of the vehicle 310 and the heading of the implement 325 such that the human operator may operate the farming machine 130 accurately and safely.

FIG. 5 illustrates a flowchart of a method for determining heading of a farming vehicle and an implement, according to an embodiment. Process 500 begins with the farming machine management system 140 receiving 510 a first set of coordinates from a first location sensor (e.g., first location sensor 315) coupled to a vehicle (e.g., vehicle 310 of farming machine 130) at a first point. The farming machine management system 140 also receives 515 a second set of coordinates from a second location sensor (e.g., second location sensor 330) coupled to an implement (e.g., implement 325) at a second point. The implement is coupled to the vehicle at a pivot point and configured to move about the pivot point such that a first heading of the vehicle and a second heading of the implement may be different. The farming machine management system 140 identifies 520 one or more intersection points (e.g., intersection points 430A, 430B, 430C) between a first circle (e.g., first circle 410) centered at the first point and a second circle (e.g., second circle 420) centered at the second point. The first circle has a first radius corresponding to a distance between the first point where the first location sensor is and the pivot point, and the second circle has a second radius corresponding to a distance between a second point where the second location sensor is and the pivot point. The farming machine management system 140 selects 525 one intersection point from the one or more intersection points based on a relative angle between the vehicle and the implement based on the selected intersection point. The farming machine management system 140 generates instructions based on the first heading and the second heading to cause the vehicle to perform an action.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for tractor control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
  receiving a first set of coordinates from a first location sensor coupled to a vehicle at a first point;
  receiving a second set of coordinates from a second location sensor coupled to an implement at a second point, wherein the implement is coupled to the vehicle at a pivot point and configured to move about the pivot point;
  identifying one or more intersection points between a first circle centered at the first point and a second circle centered at the second point, the first circle having a first radius corresponding to a distance between the first point and the pivot point and the second circle having a second radius corresponding to a distance between the second point and the pivot point;

selecting one intersection point from the one or more intersection points based on a relative angle between the vehicle and the implement;
responsive to determining that the vehicle is moving at a speed below a threshold speed, determining a first heading associated with the vehicle and a second heading associated with the implement based on the selected intersection point;
responsive to determining that the vehicle is moving at or above the threshold speed, determining the first heading associated with the vehicle and the second heading associated with the implement without considering the selected intersection point; and
configuring the vehicle to drive a path autonomously based on the first heading and the second heading, the vehicle being an autonomous vehicle that drives the path without human input.

2. The method of claim 1, wherein the relative angle between the vehicle and the implement is between a first vector that passes through a center of the vehicle and the pivot point and a second vector that passes through a center of the implement and the pivot point.

3. The method of claim 1, further comprising:
identifying a threshold angle between the vehicle and the implement when the first circle and the second circle are tangent and have exactly one intersection point;
determining whether there is one intersection point or two intersection points in the one or more intersection points between the first circle and the second circle;
responsive to determining that there are two intersection points, comparing the relative angle to the threshold angle;
responsive to the relative angle being less than the threshold angle, selecting a first intersection point of the two intersection points; and
responsive to the relative angle being greater than the threshold angle, selecting a second intersection point of the two intersection points.

4. The method of claim 3, wherein responsive to determining that there is one intersection point, selecting the intersection point.

5. The method of claim 1, wherein the relative angle between the vehicle and the implement is determined using a potentiometer.

6. The method of claim 1, further comprising:
receiving an image from a camera coupled to the vehicle to face toward the implement, wherein the image captures at least a portion of the implement;
inputting the image into a machine learning model and receiving as output from the machine learning model the relative angle between the vehicle and the implement.

7. The method of claim 6, wherein one or more of dimensions of the vehicle, dimensions of the implement, the first point, the second point, and the pivot point are input into the machine learning model.

8. The method of claim 6, wherein the machine learning model is trained using training data including images of historical implements, each image associated with a pair of historical vehicle and a historical implement and labeled with a bounding box around the historical implement and a relative angle between the historical vehicle and the historical implement.

9. The method of claim 8, wherein each image is further labeled with one or more of dimensions of the historical vehicle, dimensions of the historical implement, a first position where a first location sensor is coupled to the historical vehicle, a second position where a second location sensor is coupled to the historical implement, and the pivot point where the historical implement and the historical vehicle are attached are input into the machine learning model.

10. A non-transitory computer-readable medium comprising computer program instructions that, when executed by a computer processor, cause the processor to perform operations, the instructions comprising instructions to:
receive a first set of coordinates from a first location sensor coupled to a vehicle at a first point;
receive a second set of coordinates from a second location sensor coupled to an implement at a second point, wherein the implement is coupled to the vehicle at a pivot point and configured to move about the pivot point;
identify one or more intersection points between a first circle centered at the first point and a second circle centered at the second point, the first circle having a first radius corresponding to a distance between the first point and the pivot point and the second circle having a second radius corresponding to a distance between the second point and the pivot point;
select one intersection point from the one or more intersection points based on a relative angle between the vehicle and the implement;
responsive to determining that the vehicle is moving at a speed below a threshold speed, determine a first heading associated with the vehicle and a second heading associated with the implement based on the selected intersection point;
responsive to determining that the vehicle is moving at or above the threshold speed, determine the first heading associated with the vehicle and the second heading associated with the implement without considering the selected intersection point; and
configure the vehicle to drive a path autonomously based on the first heading and the second heading, the vehicle being an autonomous vehicle that drives the path without human input.

11. The non-transitory computer-readable medium of claim 10, wherein the relative angle between the vehicle and the implement is between a first vector that passes through a center of the vehicle and the pivot point and a second vector that passes through a center of the implement and the pivot point.

12. The non-transitory computer-readable medium of claim 10, wherein the instructions comprise instructions to:
identify a threshold angle between the vehicle and the implement when the first circle and the second circle are tangent and have exactly one intersection point;
determine whether there is one intersection point or two intersection points in the one or more intersection points between the first circle and the second circle;
responsive to determining that there are two intersection points, compare the relative angle to the threshold angle;
responsive to the relative angle being less than the threshold angle, select a first intersection point of the two intersection points; and
responsive to the relative angle being greater than the threshold angle, select a second intersection point of the two intersection points.

13. The non-transitory computer-readable medium of claim 12, wherein responsive to determining that there is one intersection point, selecting the intersection point.

14. The non-transitory computer-readable medium of claim 10, wherein the relative angle between the vehicle and the implement is determined using a potentiometer.

15. The non-transitory computer-readable medium of claim 10, wherein the instructions comprise instructions to:
receive an image from a camera coupled to the vehicle to face toward the implement, wherein the image captures at least a portion of the implement;
input the image into a machine learning model and receiving as output from the machine learning model the relative angle between the vehicle and the implement.

16. The non-transitory computer-readable medium of claim 15, wherein one or more of dimensions of the vehicle, dimensions of the implement, the first point, the second point, and the pivot point are input into the machine learning model.

17. The non-transitory computer-readable medium of claim 15, wherein the machine learning model is trained using training data including images of historical implements, each image associated with a pair of historical vehicle and a historical implement and labeled with a bounding box around the historical implement and a relative angle between the historical vehicle and the historical implement.

18. The non-transitory computer-readable medium of claim 17, wherein each image is further labeled with one or more of dimensions of the historical vehicle, dimensions of the historical implement, a first position where a first location sensor is coupled to the historical vehicle, a second position where a second location sensor is coupled to the historical implement, and the pivot point where the historical implement and the historical vehicle are attached are input into the machine learning model.

19. A system comprising:
one or more processors; and
a non-transitory computer-readable medium comprising computer program instructions that, when executed by the one or more processors, cause the one or more processors to perform operations comprising:
receiving a first set of coordinates from a first location sensor coupled to a vehicle at a first point;
receiving a second set of coordinates from a second location sensor coupled to an implement at a second point, wherein the implement is coupled to the vehicle at a pivot point and configured to move about the pivot point;
identifying one or more intersection points between a first circle centered at the first point and a second circle centered at the second point, the first circle having a first radius corresponding to a distance between the first point and the pivot point and the second circle having a second radius corresponding to a distance between the second point and the pivot point;
selecting one intersection point from the one or more intersection points based on a relative angle between the vehicle and the implement;
responsive to determining that the vehicle is moving at a speed below a threshold speed, determining a first heading associated with the vehicle and a second heading associated with the implement based on the selected intersection point;
responsive to determining that the vehicle is moving at or above the threshold speed, determining the first heading associated with the vehicle and the second heading associated with the implement without considering the selected intersection point; and
configuring the vehicle to drive a path autonomously based on the first heading and the second heading, the vehicle being an autonomous vehicle that drives the path without human input.

20. The system of claim 19, wherein the relative angle between the vehicle and the implement is between a first vector that passes through a center of the vehicle and the pivot point and a second vector that passes through a center of the implement and the pivot point.

* * * * *